March 24, 1964   J. A. HARRELL   3,126,056
HYDRAULIC FRACTURING OF EARTH FORMATIONS
Filed April 11, 1962
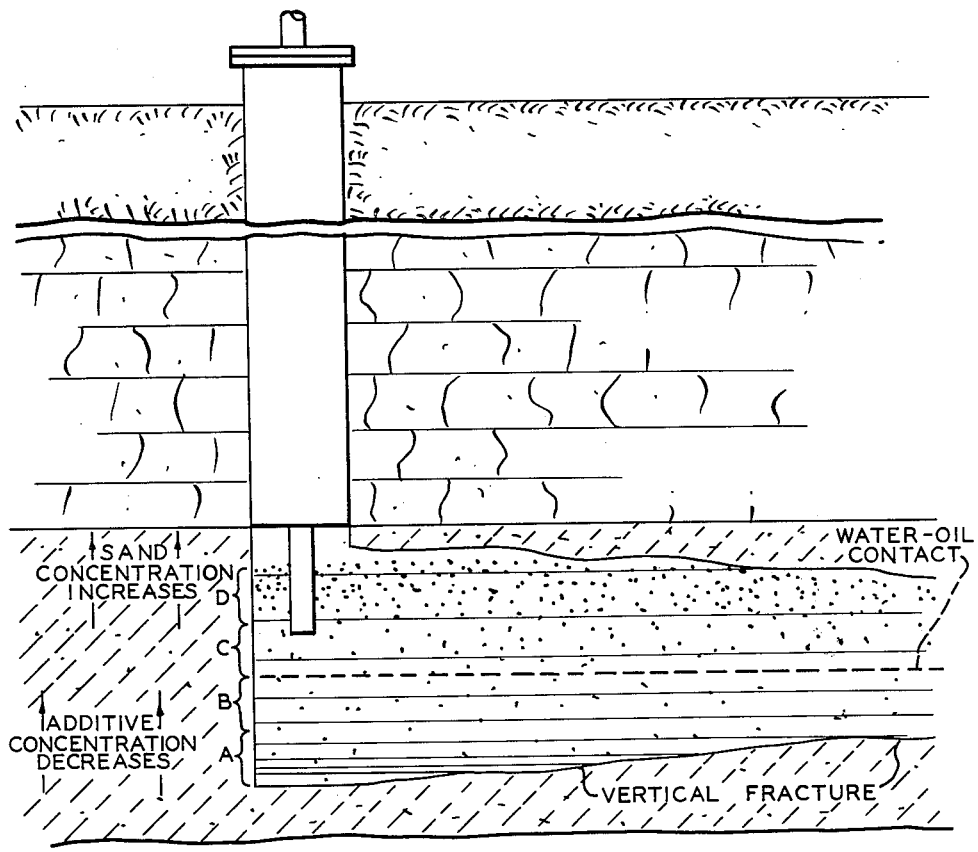
INVENTOR.
J. A. HARRELL
BY
ATTORNEYS

United States Patent Office 3,126,056
Patented Mar. 24, 1964

3,126,056
HYDRAULIC FRACTURING OF EARTH FORMATIONS
James A. Harrell, Hobbs, N. Mex., assignor to Phillips Petroleum Company, a corporation of Delaware
Filed Apr. 11, 1962, Ser. No. 186,730
4 Claims. (Cl. 166—42)

This invention relates to hydraulic fracturing of earth formations. In one of its aspects, it relates to a method of hydraulic fracturing of an earth formation to create a fracture therein from which petroleum can be produced by injecting into the earth formation, as by an initially formed well bore, a fluid containing a propping agent and a sealing agent in a manner to deposit in lower regions of the fracture produced a quantity of sealing agent sufficient to seal said region against expected water flow, while nevertheless propping said fracture at said regions, and then varying the proportion of sealing agent in the fluid as the fracture is filled to deposit less and less sealing agent until there is obtained sufficient sealing agent in the expected water flow regions sufficient to seal the same against water flow, but insufficient sealing agent at the regions of expected oil flow to seal the same against oil flow, all the time propping the entire formation.

It is known to produce fractures in earth formations by pumping thereinto a fluid under a pressure sufficient to cause said fracture. Thus oil-bearing formations are penetrated by wells and are subjected to hydraulic pressure to fracture the formations thus to increase the flow of oil to the well. The fractures thus produced sometimes extend into water-bearing zones. As a result, there may be produced a greatly increased quantity of water such that producing the oil which is there available becomes expensive and sometimes prohibitive. It is known to provide methods which will decrease the tendency of fractures to penetrate into water-bearing zones, as by sealing such fractures with a sealing fluid. It is old in the fracturing of earth formations to inject into the formation a treating solution designed to form a precipitate when it is diluted with water. When such a treating solution is used in advance of the usual fracturing fluid or as a part thereof and the fracture enters a water-bearing zone, the water dilutes the treating solution and causes the said precipitate to form. Thus it is known that a solution as here described can be prepared by dissolving rosin polymers in a solvent such as a water miscible alcohol. It is also known to allow a treating fluid to remain within an induced fracture for a time sufficient to cause a phenol and an aldehyde therein to form a condensation product, such a fluid will also contain a condensation catalyst. Further, it is old to pump an oil-cement slurry, which may contain a dispersing agent, into a formation. Propping agents have been described to be hydraulically-settable solids such as Portland cement clinker having a particle size of between about 10 and 100 mesh or smaller. Hydraulic solids of intermediate settable character, such as bentonitic clay, silica and alumina gels, which seal upon contact with water, but do not permanently set, likewise have been described as utilizable. A particular operation has been described in which cement clinker having a particle size of between 10 and 200 mesh is used in concentrations of about .5 to 15 pounds per gallon of a hydrocarbon liquid, the cement clinker of desired size being suspended in the gelled hydrocarbon or the clinker in gelling agent being concurrently added to a hydrocarbon and the fluid suspension pumped into the well where the gelling is completed. Pressure is exerted upon the suspension of settable solids and gelled hydrocarbon so the formation is fractured and at least a part of the suspension introduced into the fracture. As hydration of the formation occurs the packing will gradually seal according to said description.

The use of cement clinker of any mesh size in the range 10–200 does not appear to sufficiently suitably prop a fracture because it will crush to a minute size allowing the fracture to close in some instances. Accordingly, a method of operation is desirable wherein the fracture is maintained propped open at all times so that the seal in the expected water-bearing portions of the formation will be protected against crushing, indeed, so that the sealing material can be protected against crushing even before the seal is actually formed.

I have now conceived the concept that a propping agent which cannot be crushed by pressure of the formation tending to close the fracture contained in it shall be used substantially at all times. Thus in the forming or propping and/or sealing of the fracture, a propping agent is present in my sealing fluid. Thus, possibly except for a spearhead of sealing fluid pumped into a newly formed fracture to be followed soon by propping agent and additional sealing fluid, according to my concept, the propping agent will be present.

An object of this invention is to hydraulically fracture a formation. Another object of this invention is to prop and to seal against water flow a certain portion of a formation while merely propping a certain other portion of said formation at a fracture therein. It is another object of this invention to provide a method for the fracturing, propping and sealing of a formation wherein the formation cannot crush the sealing material either before it has formed a seal upon contact with water or with passage of time or after it has formed such a seal.

Other aspects, objects, and the several advantages of this invention are apparent from a study of this disclosure, the drawing, and the appended claims.

According to the present invention, there is provided a method of propping and sealing a fracture in the earth which is suitable to the modification of a formation from which petroleum can be produced, and for preventing substantially undesired water flow with the petroleum produced therefrom which comprises injecting a fluid into the formation, dosing into said fluid in the earlier stages of its injection a water-blocking substance and a fracture-propping substance and during the injection varying the amount of the water-blocking substance so as to lay down sufficient water-blocking substance to block the portion of the formation expected to produce undesirable quantities of water, but not to block the portion of the formation from which petroleum is to be produced, while at all times maintaining in the fluid when it is being pumped into the formation desired to be modified by sealing and propping, a quantity of propping substance sufficient to prop the formation and still maintain sufficient propping substance in the fluid to prop the portion which is desired to be propped but not sealed against water.

It will be obvious to those versed in this art in possession of this disclosure, having studied the same, that it is applicable, very desirably, to fractures which are more or less vertical in character, although the invention is not limited thereto.

Referring now to the drawing, there is diagrammatically shown a view of a fracture, the shading representing concentration of sealing agent or additive as indicated by the left-hand arrow. It will be noted that the additive concentration decreases as the fracture is filled. For sake of convenience in discussing the drawing, sections A, B, C and D have been marked. Section A will contain, according to the invention, the highest concentration of sealing substance. This sealing substance can be a known sealing substance and can be a bentonitic material, resin or dry cement. In a now preferred form of the invention, the sealing substance and sand, which is the propping agent here used, are pumped into the fracture in the formation. At all times there is sufficient sand, beyond possibly a spearhead in section A at its bottom, to maintain section A substantially propped against closure by pressure of the formation. As pumping progresses and the additive concentration decreases, the sand in the fluid is increased until passing through sections B, C and D there is increased the propping agent to such an extent that about the water-oil contact or interface between sections B and C will be about the highest level sealed against water flow. In other words, sections C and D may flow some water if water shows. However, the expected undesired water flow in this fracture would have been primarily from section A and secondarily from section B and not from sections C and D. Bearing in mind such factors as surface tension of water and oil with respect to the formation and propping agent used, it can be seen that the flow of water from sections C and D can be controlled to a desired or predetermined maximum, i.e. the amount of water flowing is minimized sufficiently so that the oil can be desirably produced.

EXAMPLE

A mixture of three sizes of sand, in order to reduce porosity, is admixed with approximately ⅓ by total volume of additive. The sand and additive are injected with the fracture fluid, in this case hydrocarbon oil, as follows: The sand concentration is increased as the treatment progresses, i.e. from one pound per gallon to two pounds per gallon to three pounds per gallon, etc. The sand mixture remains constant throughout the treatment. Thus, there is present in the sand mixture 50 percent of 20–40 mesh and 50 percent 40–60 mesh if only two sizes of sand are admixed, and when three sizes of sand are admixed, some of the higher and lower mesh sizes can be replaced with intermediate mesh sizes. During progress of the treatment, the additive concentration is decreased, that is, from, say, three pounds per gallon to two pounds per gallon, and finally, to one pound per gallon. In this example the treating pressure is kept at the very minimum required to cause the formation to fracture and the injection rate is kept under 15 barrels per minute, using a hydrocarbon fluid with a high fluid loss or a high leak off rate to help minimize the vertical extent of the fracture.

It will be noted that gravity causes the fracture to fill from the bottom to the top. Thus, the sand mixture with the highest concentration of additive is deposited in the lower part of the vertical fracture below the expected water-oil contact or interface. After treatment when production is restored, the water is absorbed by the additive which swells or sets up and plugs off or largely reduces the permeability in the fracture below the water-oil interface. The concentration of additive in the upper part of the fracture being less than required to seal off any reaction due to conate water is not enough to limit the flow of the oil.

In the execution of the present invention, cement in powder form can be mixed with sand or walnut hulls, metal pellets, etc. The success of the invention is in the concept of mixing and the method of injection into the formation. Thus there are admixed at least one propping and at least one sealing material and the concentration of the sealing material is varied as described. The particles of cement will fall faster in a thin fluid of low viscosity. Therefore, such a fluid is now preferred. Thus in a now preferred form of the invention there is first injected into the well bore a thin fluid containing the greatest concentration of fine cement particles in suspension. This spearhead of fluid which can contain only the cement will create the fracture. The suspension of cement particles at first will be more or less uniform throughout the fracture. Following this spearhead fluid there will be a thicker fluid carrying the fracture propping agent, sand, pellets, etc., and a smaller concentration of the cement. The large concentration of cement injected first will now have settled out in the bottom of the fracture as the thin (low viscosity) fluid will have leaked off into the rock matrix. The thicker fluid now flows into the fracture carrying the mixture propping agent and cement. Thus, when the pumping is stopped the fracture will be filled with two types of material: (1) fine cement particles which decrease in concentration toward the top of the fracture above the water-oil contact, and (2) the propping agent which is more or less uniformly distributed throughout the fracture from bottom to top.

The following information is given by way of further expansion and development of the invention to more fully explain it to one skilled in the art.

*Ratio of Sealing Agent to Sand*

|  | Broad Range | New Preferred Ratio |
| --- | --- | --- |
| Initial | 100/1 to 1/20 | 3/1 |
| Final | 1/1 to 1/100 | 1/3 |

The size of sand particles can be any size or mixture of sizes that is in use in the art at the present time. The usual size range is 8 to 12 mesh (largest) down to 40 to 60 mesh (smallest).

The invention can be used at any time during the life of a well. It can be used early to increase production and to seal off a water producing formation. Later, the oil-water interface may rise because of oil production and thus refracturing may be desirable to increase production again and to seal off the water portion of the formation at its new level.

Reasonable variation and modification are possible within the scope of the foregoing disclosure, drawing, and the appended claims to the invention the essence of which is that a propping agent and a sealing agent are admixed in the filling of a fracture in a formation or in the formation of a fracture during the filling of the fracture there being propping agent present substantially at all times, except for a possible "spearhead" and the sealing agent being reduced in concentration when the fracture has been filled to a level at which undesirable quantities of water will not be produced.

I claim:

1. A method of propping and at the same time sealing an earth formation fracture from which petroleum can be produced which comprises passing into said fracture as it is being propped an admixture of propping and sealing materials, initially passing into the formation an admixture as described in which the proportion of sealing material is selected so as to seal the propped formation, at lower levels at which water is apt to be found or to collect, when water is present, then as the formation is being propped reducing the proportion of sealing material and increasing the proportion of propping material in a manner such that the relative quantities of sealing and propping materials deposited at higher and higher levels in the formation will be such that the fracture from at about the expected petroleum-water interface to a higher level will now be primarily propped and not sealed so that water flowing at levels higher than said expected interface will be produced in lieu of causing a sealing of the formation.

2. A method according to claim 1 wherein at all times a sufficient quantity of propping material is deposited throughout the formation to maintain the fracture space and wherein the desired to be sealed portion receives a deposit of sealing material sufficient to seal the fracture when water contacts said sealing material.

3. A method of forming, propping and sealing an earth formation suitable for use in the production of petroleum which comprises injecting into a well a spearhead of fracturing fluid comprising a relatively thin fluid containing a suspension of fine cementing particles, creating a fracture with said fluid, permitting settling of said particles into lower regions of the fracture, and some loss of fluid into the surrounding formation, then injecting into said formation a thicker fluid containing a propping agent and a now reduced quantity of cementing particles, to obtain a filling of the fracture which is high in cementing particles at the lower regions of the fracture and low in the upper regions of the fracture, the quantity of propping material throughout a substantial portion of the fracture being sufficient to prop the fracture and the cementing particles being sufficient to seal the fracture upon water contact therewith only in the regions of the fracture which are approximately at or below the expected petroleum-water interface of the fracture as it is intended to be produced.

4. A method of propping and sealing a fracture in the earth which is suitable to the modification of a formation from which petroleum can be produced and for preventing substantially undesired water flow with the petroleum produced therefrom which comprises injecting a fluid into the formation, dosing into said fluid in the early stages of its injection a water-blocking substance and a fracture-propping substance and during the injection varying the amount of the water-blocking substance so as to lay down sufficient water-blocking substance to block the portion of the fracture expected to produce undesirable quantities of water but not to block the portion of the formation from which petroleum is to be produced while at all times maintaining in the fluid when it is being pumped into the formation desired to be modified by sealing and propping a quantity of propping substance sufficient to prop the formation and still maintaining sufficient propping substance in the fluid to prop the portion which is desired to be propped but not sealed against water.

References Cited in the file of this patent
UNITED STATES PATENTS

| | | |
|---|---|---|
| 2,337,295 | Kennedy | Dec. 21, 1943 |
| 2,699,212 | Dismukes | Jan. 11, 1955 |